United States Patent
Schmidt

(10) Patent No.: US 6,366,951 B1
(45) Date of Patent: *Apr. 2, 2002

(54) DISTRIBUTED PROCESSING SYSTEM WHERE A MANAGEMENT COMPUTER AUTOMATICALLY CONNECTS REMOTE REDUCED-CAPABILITY WORKSTATIONS WITH CENTRALIZED COMPUTING MODULES

(76) Inventor: Curt A. Schmidt, 16178 E. Sierra Pass Way, Hacienda Heights, CA (US) 91745

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/017,398

(22) Filed: Feb. 2, 1998

Related U.S. Application Data

(60) Provisional application No. 60/037,482, filed on Feb. 3, 1997, and provisional application No. 60/037,481, filed on Feb. 3, 1997.

(51) Int. Cl.[7] ..................... G06F 15/16; G06F 15/177
(52) U.S. Cl. ................ 709/208; 709/220; 709/223; 712/31
(58) Field of Search .................. 709/208, 220, 709/223, 201; 700/3; 710/110; 712/31; 345/520, 522, 2.1

(56) References Cited

U.S. PATENT DOCUMENTS

| | | | | |
|---|---|---|---|---|
| 4,737,950 A | * | 4/1988 | Fechalos | 370/56 |
| 5,315,711 A | * | 5/1994 | Barone et al. | 340/706 |
| 5,337,229 A | * | 8/1994 | Holland | 700/2 |
| 5,437,014 A | * | 7/1995 | Busboom et al. | 340/706 |
| 5,499,377 A | * | 3/1996 | Lee | 709/244 |
| 5,577,205 A | * | 11/1996 | Hwang et al. | 709/208 |

(List continued on next page.)

FOREIGN PATENT DOCUMENTS

| | | |
|---|---|---|
| EP | 0 359 064 | 3/1990 |
| WO | WO 94/22088 | 9/1994 |

OTHER PUBLICATIONS

Halsall, F., "Data Communications, Computer Networks, and Open Systems," 4th ed., Addison–Wesley, pp. 355–357, 1996.*
Edwards, B., "WinFrame Works Wonders," LAN Times, vol. 13, No. 24, p. 87, Oct. 1996.*
Henderson, T., "Center of the Universe," Windows Magazine, vol. 7, No. 10, pp. 244, Oct. 1996.*
Stanczak, M., "Not Just a 'Dumb' Terminal: Wyse Win Term Model 2000 Units Edge into Internet Terminal Area," PC Week, vol. 13, No. 5, p. 59, Feb. 1996.*
Flanagan, W., "ICA greets the NC," Computer Shopper, vol. 16, No. 12, p. 624, Dec. 1996.*

*Primary Examiner*—Zarni Maung
*Assistant Examiner*—Andrew T. Caldwell
(74) *Attorney, Agent, or Firm*—Christie, Parker & Hale, LLP

(57) ABSTRACT

A distributed computer system having centrally available processing units. A plurality of computer workstations are connected to a plurality of processing units by computer transmission cables. In one embodiment each of the workstations may be connected to any of the plurality of processing units. These connections are accomplished by a switching unit controlled by a management computer where the management computer automatically connects and disconnects individual computer workstations to individual processing units. In a typical embodiment, there are more computer workstations then processing units and the management computer disconnects idle computer workstations from processing units and connects previously idle computer workstations that become active to processing units not then connected to another computer workstation. A portion of a video display adapter is included in computer workstations while a second portion of a video display adapter is included in the processing units.

3 Claims, 11 Drawing Sheets

U.S. PATENT DOCUMENTS

| | | | | |
|---|---|---|---|---|
| 5,673,393 A | * | 9/1997 | Marshall et al. | 709/204 |
| 5,710,893 A | * | 1/1998 | Lindgren | 713/201 |
| 5,721,842 A | * | 2/1998 | Beasley et al. | 710/131 |
| 5,790,792 A | * | 8/1998 | Dudgeon et al. | 709/212 |
| 5,812,785 A | * | 9/1998 | Lappen et al. | 709/231 |
| 5,918,039 A | * | 6/1999 | Buswell et al. | 345/335 |
| 5,931,509 A | * | 8/1999 | Bartholomew et al. | 340/717 |
| 6,009,470 A | * | 12/1999 | Watkins | 709/231 |
| 6,012,101 A | * | 1/2000 | Heller et al. | 709/250 |
| 6,038,616 A | * | 3/2000 | Thornton et al. | 710/2 |
| 6,070,214 A | * | 5/2000 | Ahern | 710/128 |
| 6,119,146 A | * | 9/2000 | Heller et al. | 709/203 |

* cited by examiner

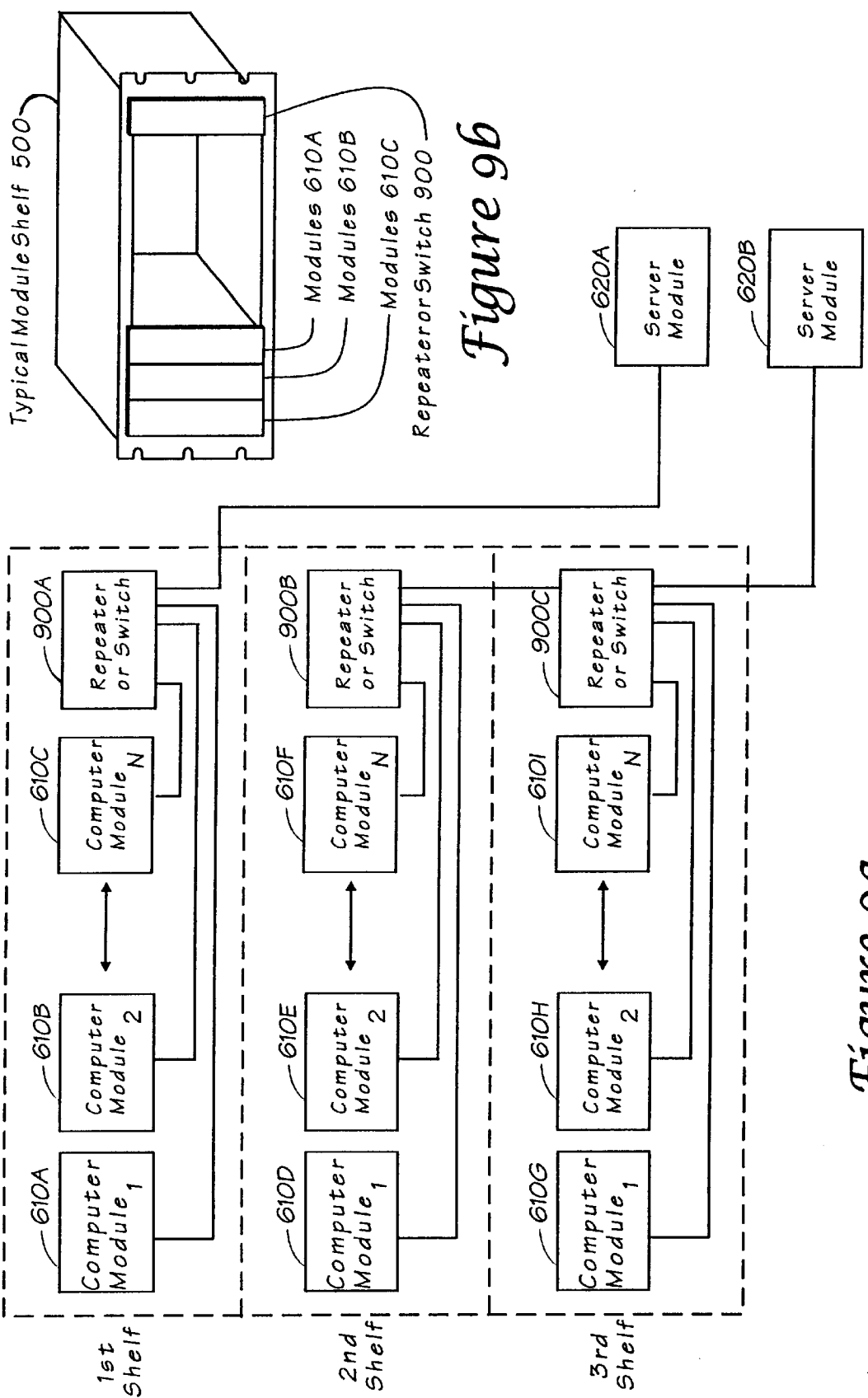

DISTRIBUTED PROCESSING SYSTEM WHERE A MANAGEMENT COMPUTER AUTOMATICALLY CONNECTS REMOTE REDUCED-CAPABILITY WORKSTATIONS WITH CENTRALIZED COMPUTING MODULES

CROSS-REFERENCE TO RELATED APPLICATIONS

This application claims the benefit of U.S. Provisional Application No. 60/037,482, filed Feb. 3, 1997 and U.S. Provisional Application No. 60/037,481 filed Feb. 3, 1997, the subject matter of both being fully incorporated by reference herein.

BACKGROUND OF THE INVENTION

The present invention relates primarily to the interconnection and physical arrangement of multiple personal computers (PCs), and more specifically to any collection of PCs that require network interconnections.

The development of the PC in the late 1970s ushered in a new chapter in the development of computing. Prior to the introduction of the PC mainframe and minicomputers were primarily used for computing needs. Such mainframe and minicomputers implement a Centralized Processing model using a centralized processor. The PC was, and remains, a complete, stand alone computer designed for use by one person. The PC, at the time of its introduction, had few, if any, physical or data security features, had no means of communicating effectively with other computers, had very little data storage capacity, and except for the simplest programs, was under-powered. However, since its introduction, PC technology has greatly improved. In the early 1980s the first PC network was introduced, and that network of PCs created both the distributed processor and the distributed processing computer models.

As networking technology improved, means were developed to connect PCs and engineering workstations that employed different computer architectures and operating systems, and as a result, networks of PCs and engineering workstations increasingly grew in size. Bridges and routers were introduced that allowed data traffic to flow from one network to another. Hubs and concentrators were introduced that allowed individual networks to further increase in size, so that today Local Area Networks (LANs) and Wide Area Networks (WANs) are highly complex installations that can span the globe. However, the basic building block of these networks remains the PC. Even though the PC has been vastly improved, having greater speed and power and significantly greater storage capacity, PCs remain, essentially, a stand alone computer with little, if any, physical or data security features, except for those imposed by a Network Operating System (NOS).

As the PC and networking technology improved, many of the applications that were once performed on mainframe and minicomputers began to migrate to networks of PCs in a process called downsizing or rightsizing. This process was enabled by the continuing improvements in PC and networking technology and the introduction of new software models such as client-server computing. However, the driving force behind downsizing is cost. The aggregate processing power and storage capacity of a small to medium-sized network of PCs may easily exceed all but the most powerful super computers, at a significantly lower cost. With software technology in place, organizations would like to continue the process of downsizing. However, organizations are reluctant to entrust their mission-critical applications to networks that do not have the physical or data security, or the reliability, that they are accustomed to in the mainframe or minicomputer environments.

Another trend in the fast moving computing industry is the increasing use of graphically intensive applications, the increasing use of sound, and the use of multimedia applications. This trend further increases the need for better performance, improved reliability, easier system management, reduced maintenance, greater security, and reduced cost of ownership.

The concept of interconnecting a plurality of personal computers is, of course, not new. Personal computer networks were introduced only a few years after the introduction of the PC. Nor is the concept of centralizing computing resources, which has long been the standard for the mainframe and minicomputer environments. However, at present no successful attempt has been made to centralize the computing resources of a network of PCs. There are PC systems currently in use that provide connections between a number of workstation consisting of a monitor, keyboard, and mouse, and a single PC. These workstations all share the single CPU in the PC. While these systems may appear to be distributed processing systems they are, in fact, a single centralized processor, similar to the mainframe and minicomputer computing model.

There are also systems currently in use that separate workstation elements from the balance of the PC. These systems use a combination of digital and analog technology to transmit the video signals (analog) from the graphics adapter in the PC system unit to the workstation, and the keyboard and mouse information (digital) from the workstation to the PC system unit. Essentially these systems use signal conditioning and amplifications to drive these signals over much greater distances than allowed by the length of the monitor, keyboard and mouse cable supplied with a standard PC. The nature and makeup of these signals, though, is the same as those carried by standard monitor, keyboard and mouse cables supplied with a standard PC.

While such systems provide a means of separating workstation and computer elements, they suffer from a number of limitations. These limitations include the need for a large number of conductors in a shielded cable. The cost of this type of cable, and the cost of the terminations for this type of cable, are considerably higher than the cost of a standard Ethernet compatible unshielded twisted pair or fiber optic cables.

Another limitation of the current art is flexibility. The type of systems described above are designed for a specific combination of workstation elements. These elements may be a monochrome monitor and keyboard, or a color monitor, keyboard, and mouse. Any change in the specified peripheral devices attached to the workstation, such as the addition of a floppy drive, CD-ROM, or printer, for example, will require a different design using additional conductors in transmission cables.

Further, systems which merely separate workstation elements from the balance of the PC suffer from a number of additional limitations, aside from the inefficient and cumbersome data transmission system described above. The centrally placed computers must share certain resources, such as floppy and CD-ROM drives, rather than having those devices available at the workstations for the exclusive use of the end users.

Other systems allow date transmission between a workstation and a remotely located computer server. Such systems suffer from a number of limitations, aside from inefficient and cumbersome data transmission system. System resources are not centralized. In fact they are further disbursed by the addition of new components at the workstations, the server computers and somewhere in between, further reducing reliability and security. All of the normal networked computers remain as fully standalone computers, connected to the field installed network.

SUMMARY OF THE INVENTION

The above described limitations, and others, are overcome by the present invention, which centralizes all computing resources, except for the workstations, and provides a highly managed switch that provides a number of additional functions, while dramatically improving reliability, performance, maintainability, and security and reducing total cost of ownership.

Accordingly, the present invention provides a computer system with a plurality of computer workstations and corresponding computer modules. The computer workstations each have a monitor, an input device, and a workstation transmission adaptor. The computer workstations each also have a first portion of a video display adaptor. The computer workstations do not have a processor forming a central processing unit, but instead, the corresponding computer modules contain such a processor. In addition to processors, each of the computer modules have short term memory and long term storage connected to the processors, as well as a second portion of a video display adaptor connected to the processor and a module transmission adaptor connected to the second portion of the video display adaptor in the processor. A plurality of cables connect the module network adaptors and the workstation network adaptors.

In one embodiment, the first portion of the video display adaptor comprises a RAM digital to analog converter connected to the monitor, a graphics RAM, and a graphics accelerator connected to the workstation network adaptor. Such an embodiment of the second portion of the video display adaptor comprises a bus interface connected to a driver connected to a bus interface connected to the processor and a module network adaptor, the driver being adapted for converting graphics commands from the processor and do graphics commands for interpretation by the graphics accelerator.

In one embodiment there is a distributed computer system having centrally available processing units. A plurality of computer workstations are connected to a plurality of processing units by computer transmission cables. In one embodiment each of the workstations may be connected to any of the plurality of processing units. These connections are accomplished by a switching unit controlled by a management computer where the management computer automatically connects and disconnects individual computer workstations to individual processing units. In a typical embodiment, there are more computer workstations then processing units and the management computer disconnects idle computer workstations from processing units and connects previously idle computer workstations that become active to processing units not then connected to another computer workstation. A portion of a video display adapter is included in computer workstations while a second portion of a video display adapter is included in the processing units.

Further objects, features, and advantages of the invention will become apparent from the following detailed description taken in conjunction with accompanying drawings showing illustrative embodiments of the invention which like parts are designated by like reference numerals throughout.

BRIEF DESCRIPTION OF THE DRAWINGS

FIG. 5b illustrates a module shelf of the cabinet of FIG. 5a;

FIG. 9a is a block diagram illustrating a Ethernet network configuration of the system of FIG. 6;

FIG. 9b illustrates a computer module shelf with an Ethernet repeater or switch of the system of FIG. 6;

DETAILED DESCRIPTION OF THE INVENTION

Figure 1:
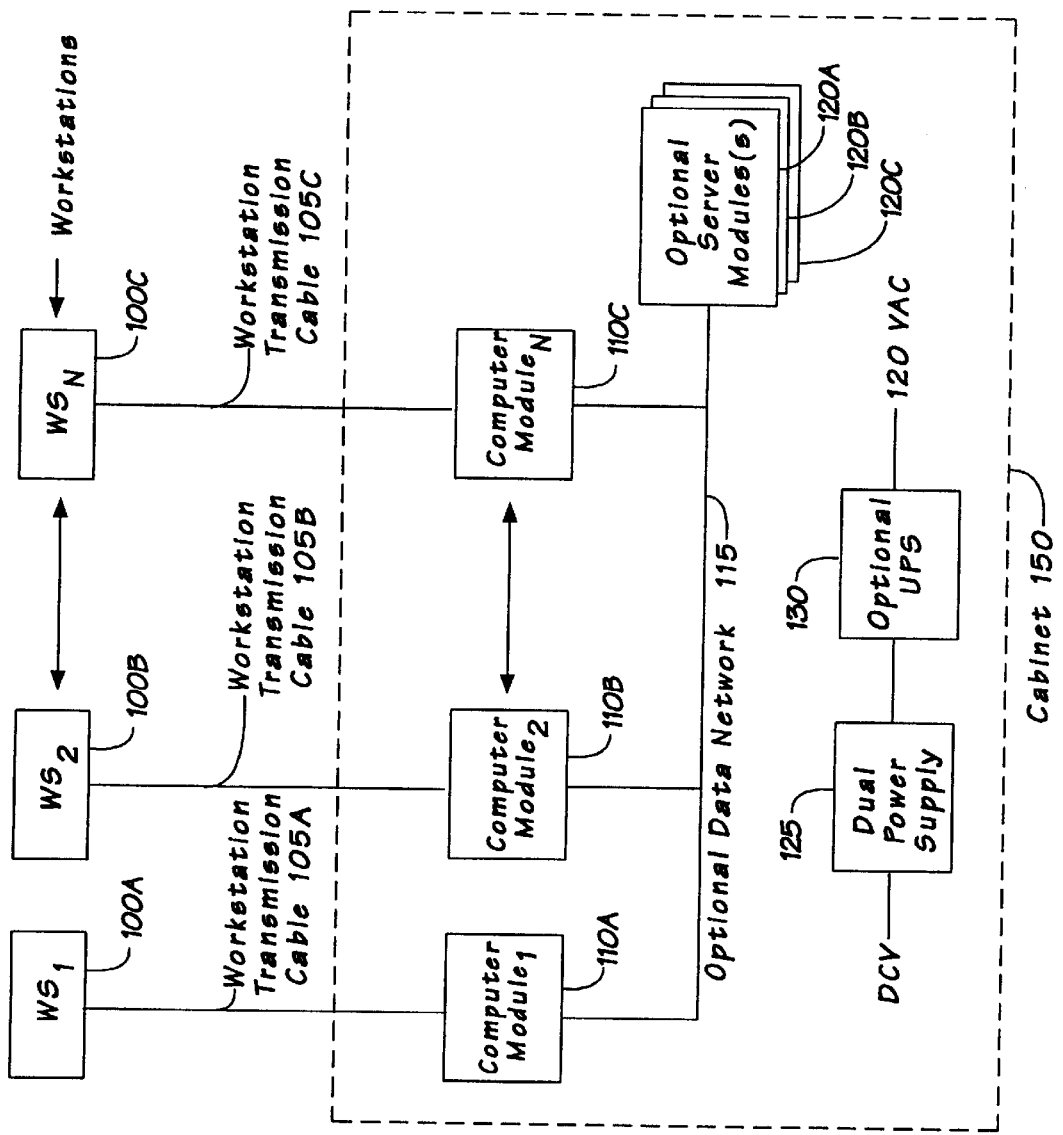
FIG. 1 is a block diagram illustrating an embodiment of a system of the present invention.

FIG. 1 is a block diagram illustrating a complete computer system according to one embodiment of the invention. A plurality of workstations 100a–c are connected to a centralized computer cabinet 150 in a star configuration. The workstations are connected to the centralized computer cabinet by workstation transmission system cables 105a–c, each of which may consist of twisted pair, coaxial, or fiber optic cable, or other suitable media. Each workstation transmission system cables 105a–c connects one of the workstations 100a–c to a corresponding computer module 110a–c located in the centralized computer cabinet 150. Optionally, each of the computer modules 110a–c are connected to one or more server modules 120a–c by a network cable 115, of the type, and in the configuration, suitable to the networking technology employed. One or more of the server modules 120a–c may be configured to perform specific functions such as a file, print, CD-ROM, access, database, client-server, WEB hosting, or as an e-mail server, or in any combination thereof. Preferably the centralized computer cabinet 150 is comprised of one or more vertical rack-mounted chassis.

Located in the bottom of each such vertical chassis are two fully rated DC power supplies 125, and an optional fully rated Uninterruptible Power Supply (UPS) 130 with batteries. The appropriate DC power is routed to each of the modules 110, 120, and other devices requiring DC power, from a fully protected DC distribution panel (not shown) co-located with the power supply 125. Also co-located with the power supply is an air filter (not shown), mounted on the bottom rear of the cabinet 150. Each of the fully rated power supplies is failure alarmed and is hot swappable. If one fails, the other can carry the full load. Further, a network administrator is notified of the failure via e-mail or other means so that the failed unit may be removed and replaced without the need to shut down the system. A thermostatically controlled ventilation system (not shown) ducts supply air through a vertical supply air plenum located on one side of the vertical chassis, across horizontal plenums on the bottom of each shelf, up through the computer module and server modules to an horizontal exhaust air plenum at the top of each shelf. This horizontal air plenum is then connected to a vertical exhaust air plenum located on the other side of the chassis. Exhaust air from the power supply module is ducted directly to the vertical exhaust plenum.

Each user at a workstation has the exclusive use a complete PC. A network, if required, is completely contained in the cabinet 150. The network includes the network cable 115 and the server modules 120. The cables 105a–c connecting the workstations 100a–c and the computer modules 110a–c are not part of the network. The cables 105a–c may be considered an extension of cables that normally connect workstation elements to a computer system unit. Thus, the embodiment illustrated in FIG. 1 preserves the distributed computing model that has been so successfully used in the PC computing environment. However, it also centralizes all CPUs, hard disk drives, tape drives, and other permanent storage devices, which has been the hallmark of the Centralized Processor computing model exemplified by the equally successful mainframe and minicomputer environments. This is the basis for the new distributed processing-centralized processor computing model, the value of which will become clear as the balance of the preferred embodiments is described below.

Figure 2:
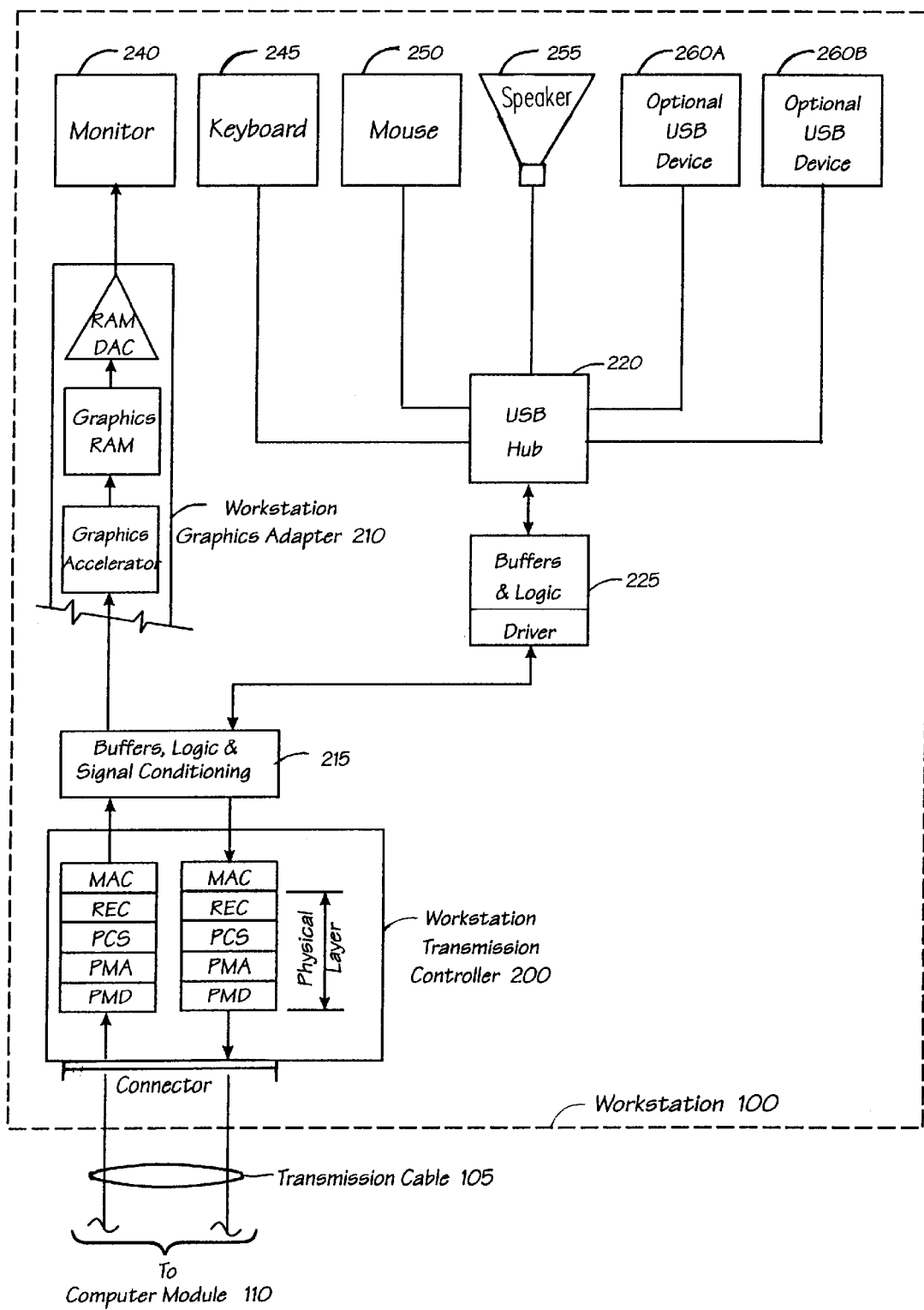
FIG. 2 is a block diagram illustrating a workstation of the system of FIG. 1.

FIG. 2 is a block diagram illustrating elements of the workstation 100, the interconnection of those elements, and the technology employed in the transmission of data between each workstation 100 and corresponding computer module 115. In the current preferred embodiment, the workstation transmission system employs Ethernet (IEEE 802.3) and USB (Universal Serial Bus) technologies, both of which are serial transmission systems. A USB hub 220 is used to provide connections between a keyboard 245, a mouse 250, a speaker 255 and optional devices 260a,b. The optional devices may be a floppy drive, CD-ROM drive, or any other standard peripheral designed with a USB interface. A monitor 240 is connected to a workstation graphics adapter 210. As discussed in more detail below, the workstation graphics adapter 210 is one part of a normal VGA graphics adapter. The USB hub 220 and the workstation graphics adapter 210 are, in-turn, connected to a workstation transmission controller 200 through buffers, logic, and signal conditioning circuits (including a custom software driver) 215 and 225. A software driver adapts the timing and frame formats of the USB standard to that of the Ethernet standard. Methodologies for so adapting timing and frame formats from the USB standard to the Ethernet Standard are well known in the art.

Figure 3:
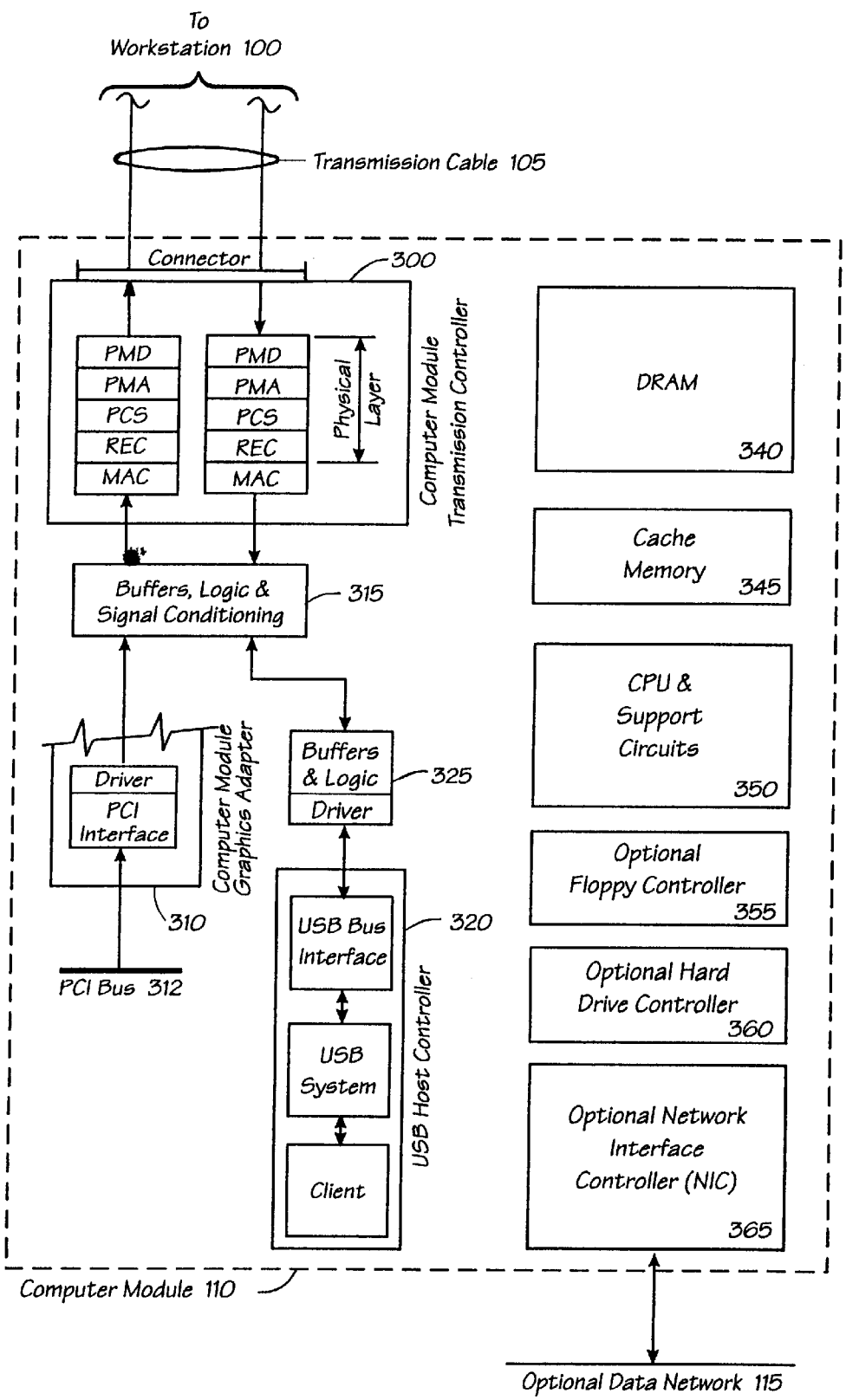
FIG. 3 is a block diagram illustrating a computer module of the system of FIG. 1.

FIG. 3 is a block diagram of the computer module 110, including the computer module end of the workstation transmission system. The computer module 110 contains all of the major components employed on a contemporary PC motherboard. The components include a DRAM 340, a cache memory 345, a CPU and support circuits 350, an optional floppy disk drive controller 355, an optional hard drive controller 360, and an optional Network Interface Controller (NIC) 365. A computer module graphics adapter 310, which comprises a portion of a normal VGA graphics adapter not included in the workstation graphics adapter 210, is connected to a transmission controller 300 by buffers, logic and signal conditioning circuits 315. A USB host controller 320 is also connected to the computer module transmission controller 300 through the buffers, logic and signal conditioning circuits 315 and 325.

The entire workstation transmission system is shown when both FIG. 2 and FIG. 3 are viewed together. The components that make up a standard PC graphics adapter (including the workstation graphics adapter 210 connected to the monitor 240 and computer module graphics adapter 310 connected to a PCI bus 312 in the computer module) are split into two parts, with the transmission system inserted in between. The split occurs after interpretation of the data stream coming from the PCI (Peripheral Component Interface) bus by the software driver, which is specific for that particular graphics adapter design. This break point provides all digital data with the lowest bandwidth requirements of anyplace along the graphics adapter data path. The USB system has also been split into two parts. The data communications between the USB hub 220 and the USB host controller 320 is combined with the graphics data and then transmitted between the workstation 100 and the computer module 110.

In the current preferred embodiment, the workstation transmission system uses Ethernet technology, a public domain technology for which commercial components and software are readily available. In this application, only one data stream is presented to the transmission controller, which is operated in full duplex mode (point-to-point), using standard category 5 cable. However, in alternative embodiments, the physical layers of the transmission (Ethernet) controllers 200 in FIG. 2 and 300 in FIG. 3, are modified so that fiber optic cable (100Base-FX) can be used over longer distances or for security reasons. The physical layer of the transmission controller consists of the PCS, PMA, and PMD (sometimes called the transceiver) components, and make up layer 1 of the Open System Interconnect (OSI) networking model, published by the ISO Standards Organization. The MAC (Media Access Control) and the LLC (Logical Link Control or driver) (not shown) make up layer 2 of the OSI model. In other alternative embodiments, completely different serial transmission technologies, such as Firewire (IEEE Std 1394), for example, are used.

Figure 4:
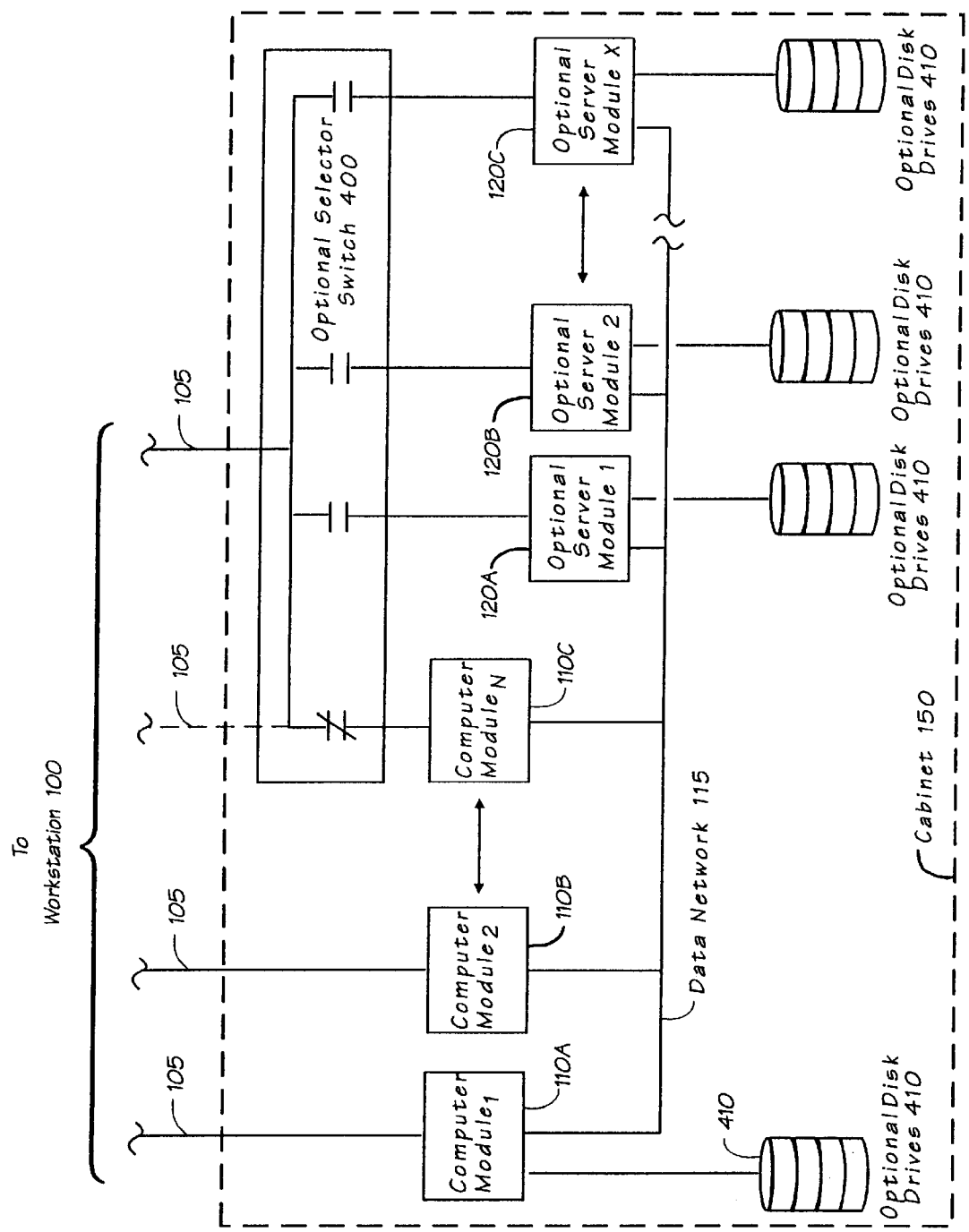
FIG. 4 is a block diagram illustrating a network configuration of the present invention.

FIG. 4 is a block diagram Illustrating a generic network configuration. The actual network technology and topology employed will depend on the number of computer modules 110 installed, the number of server modules 120 used, the use of communications equipment (if any), and the specific requirements of the customer. The network cable 115, is shown in an Ethernet 10Base-2 (10 megabits per second (Mbps)) configuration using coaxial cable, which is suitable for a small system. In the case of a larger system, a 100 Mbps Ethernet 100Base-FX system may be required, in which case a repeater (not shown) would be required. In the preferred embodiment the computer 110 and the server 120 modules are installed in a star configuration from the repeater. Other systems, such as Token Ring, could also be employed.

An optional selector switch 400 may be employed to allow the systems administrator to switch between one or more server modules 120a–c and the computer module 110a–c. If a network is not installed, then the selector switch 400 is not required. If only one server module 120 is installed, the server module could be directly connected to the workstation 100, located at the system administrator's workplace, and again a selector switch is not required. Generally, only in the case where multiple server modules 120 and computer modules 110 were to be managed from a single location would the selector switch 400 be employed. The selector switch 400 is a multi-pole mechanical or electronic switch.

Figure 5B:
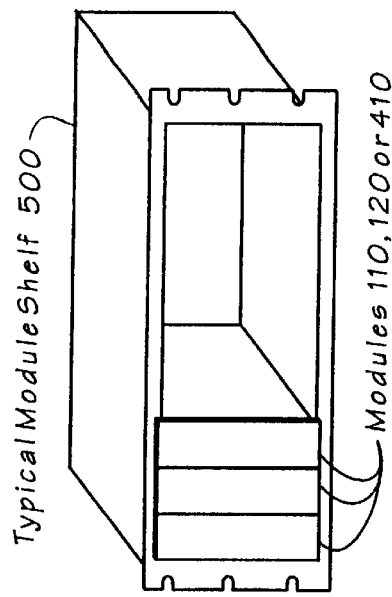
Figure 5A:
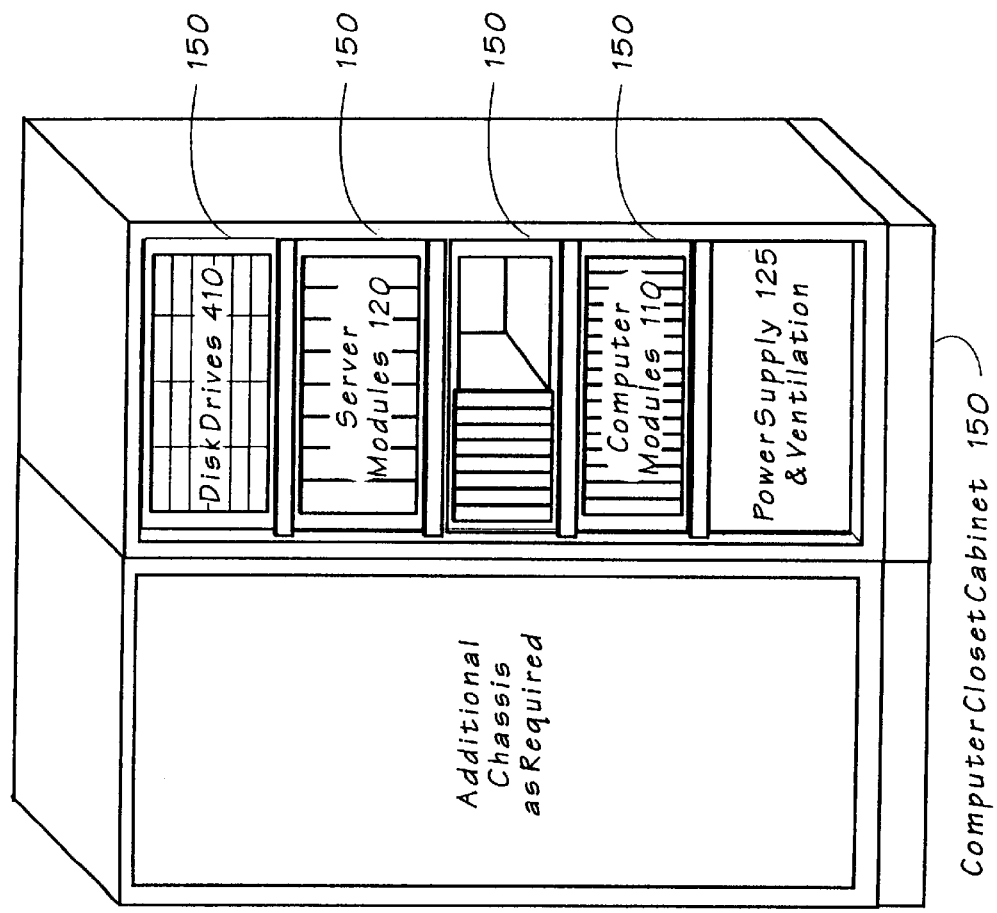
FIG. 5a illustrates a cabinet for the computer module of FIG. 3.

FIG. 5a illustrates a layout of a typical cabinet 150. The cabinet 150 comprises one or more freestanding metal chassis. The cabinet is approximately 60 to 72 inches high, 3 feet deep, and has a front opening suitable for a 19 inch or 24 inch, pre-punched rack mounting frame. Individual modules are inserted into a module shelf 500, shown in FIG. 5b. The module shelf is designed specifically for each type of module, computer module, server modules, disk drives, etc. The back end of the module shelf contains the plug-in connector for each module. The depth of the card-edge connectors on the module varies so that all signal connections are made before the power supply connections. This allows each module to be hot swappable. The rear of the cabinet 150 is covered with a lockable sheet metal door (not shown) fitted with EMI/RFI gasketing. The front of the cabinet 10 is also covered with a lockable sheet metal door frame with a smoked Lexan panel (not shown), and is also fitted with EMI/RFI gasketing.

Figure 6:
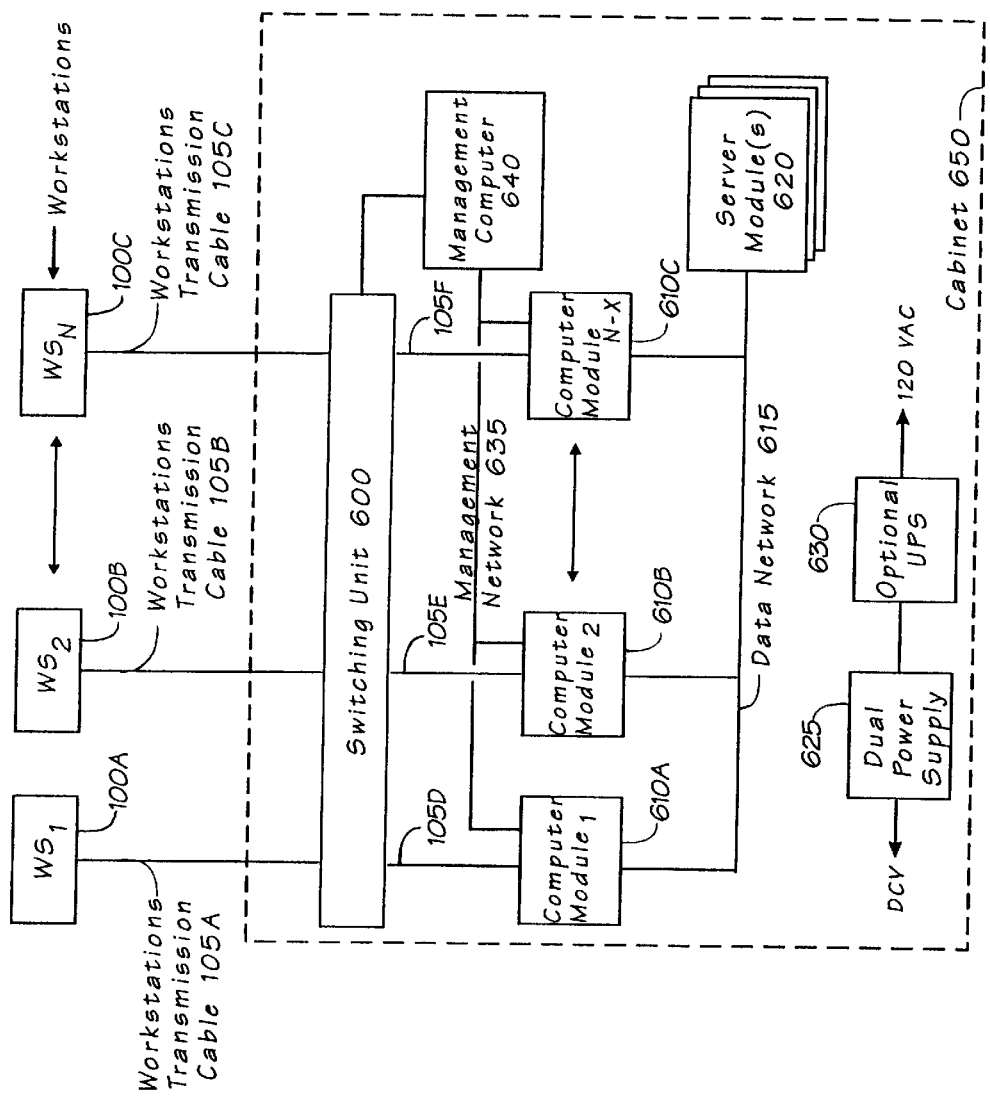
FIG. 6 is a block diagram illustrating another embodiment of the system of the present invention.

FIG. 6 is a block diagram illustrating another embodiment of the invention. A plurality of workstations 100 and computer modules 610 are connected to an electronic switching unit 600, located in the centralized cabinet 650 in a star configuration. The workstations and computer modules are connected to the electronic switching unit using twisted pair, coaxial, fiber optic cable, or other suitable media 105.

Each of the computer modules 610 are connected to one or more server modules 620 by a data network cable 615, of the type, and in the configuration, suitable to the networking technology employed. One or more of the server modules 620 may be configured to perform specific functions such as a file, print, CD-ROM, access, database, client-server, WEB hosting, or as an e-mail server, or in any combination thereof.

One of the objectives of the switching unit 600 is to connect any one of the plurality of workstations 100 to anyone of a lesser number of computer modules 610. This is done because not everyone with a workstation is using his or her computer at the same time. This is analogous to a telephone PBX which may connect anyone of say 1,000 telephone extensions to any one of say 100 outside trunk lines. This works because not every one of the 1,000 extensions is using an outside line at the same time.

The switching unit 600 is controlled by the management computer 640, which also monitors each of the computer modules 610 across the management network 635, and also performs a number of other functions, which are described below. Having fewer computer modules 610 than workstations 100 provides a higher degree of equipment utilization and reduces the total cost of ownership. The switching unit 600 routes the workstation transmission cable 105 from the workstation 100 to the computer module 610, making a permanent connection between the workstation 100 and the computer module 610 for as long as the computer module is in use by the user at workstation 100.

Located in the bottom of each of the vertical, rack-mounted, chassis that make up the cabinet 650, are two fully rated DC power supplies 625, and an optional fully rated Uninterruptible Power Supply (UPS) 630 with batteries. The appropriate DC power is routed to each of the computer modules 610, the server modules 620, and the management computer 640 and any other device requiring DC power, from a fully protected DC distribution panel co-located with the power supply 625. Also co-located with the power supply is an air filter, mounted on the bottom rear of each vertical in cabinet 650. Each of the fully rated power supplies 625 is failure alarmed and hot swappable. If one fails, the other can carry the full load, while the network administrator is notified, and the failed unit is removed and replaced without the need to shut down the system. The thermostatically controlled ventilation system ducts supply air through a vertical supply air plenum located on one side of the vertical chassis, across a horizontal plenum on the bottom of each shelf, through each module, and to the horizontal exhaust air plenum at the top of each shelf. This horizontal exhaust air plenum is connected to a vertical exhaust air plenum located on the other side of the vertical chassis. Exhaust air from the power supply module is ducted directly to the vertical exhaust plenum.

At this point it should be noted that each user at a workstation has the exclusive use a complete PC. A network is completely contained in the cabinet 650. The cable 105 connecting the workstations 100 and the computer modules 610 is not part of the network. It may be considered as an extension of those cables that normally connect workstation elements to the computer system unit. Thus, the distributed computing model that has been so successfully used in the PC computing model exemplified by the equally successful mainframe and minicomputer environments. This is the basis for the new distributed processing-centralized processor computing model, the value of which will become clear as we describe the balance of this preferred embodiment.

Figure 7:
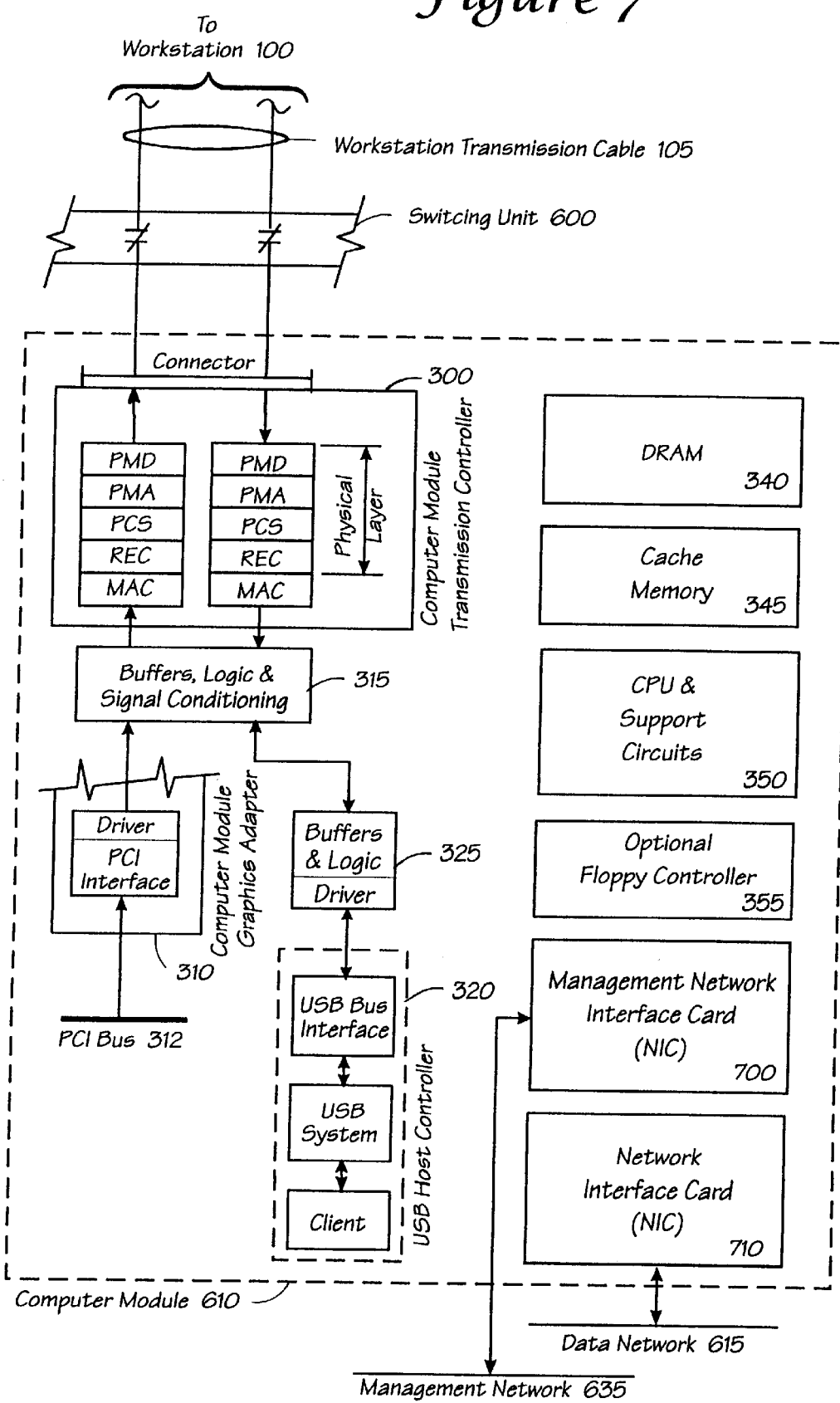
FIG. 7 is a block diagram illustrating a computer module of the system of FIG. 7.

The workstation used in this embodiment is the same as described in the first embodiment shown in FIG. 1. Accordingly, FIG. 7, which illustrates a block diagram of computer module 610, is similar to the illustration of the computer module 110 shown in FIG. 3. The primary difference is that computer module 610 contains a management network interface controller 700, and does not contain the optional hard drive controller 365 used in computer module 110.

Figure 8:
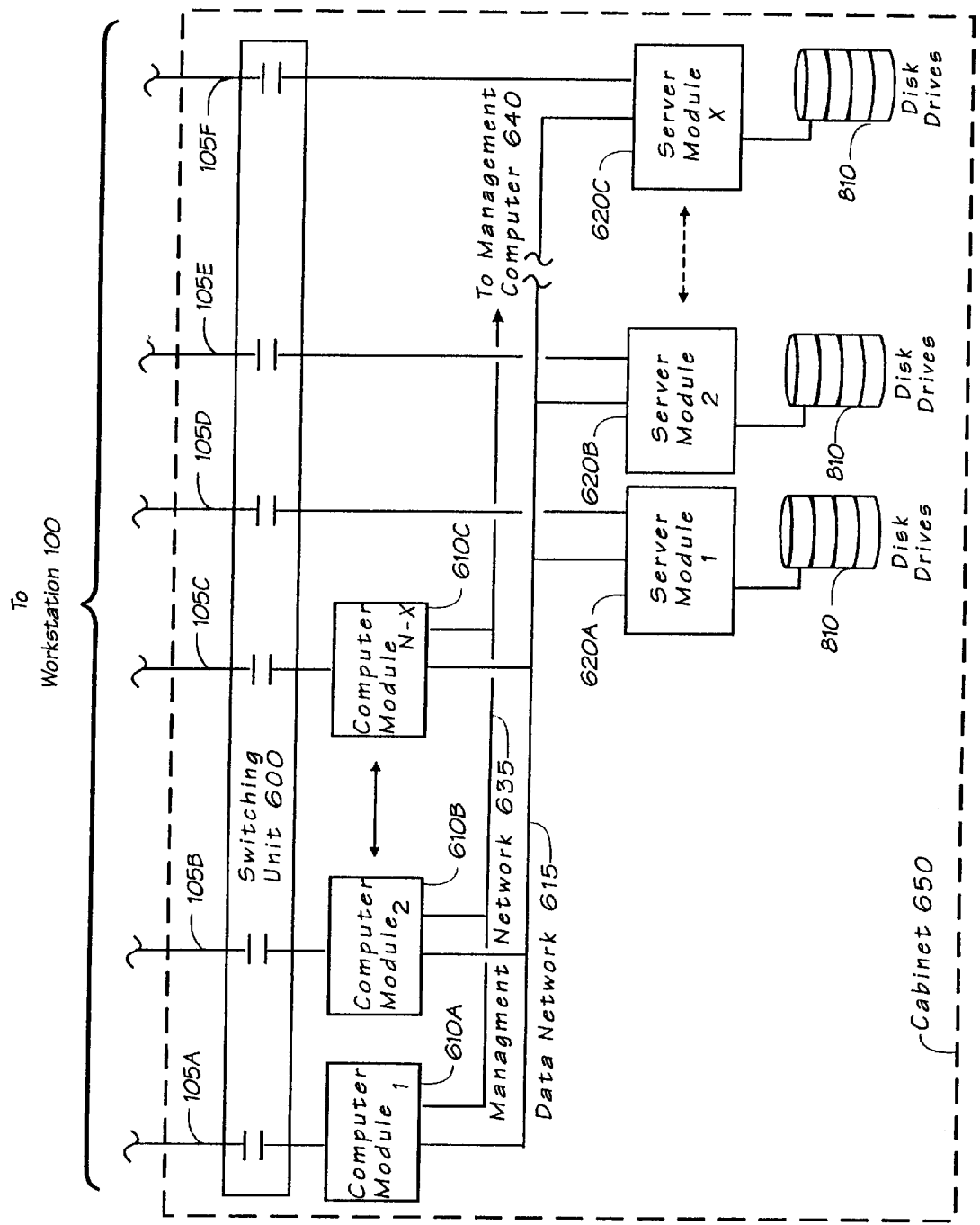
FIG. 8 is a block diagram illustrating a network configuration of the system of FIG. 6.

FIG. 8 is a block diagram illustrating a generic network configuration for this embodiment. The actual network technology and topology employed will depend on the number computer modules 610 installed, the number of server modules 620 used, the use of communications equipment (if any), and the specific requirements of the customer. The data network cable 615, is shown as an Ethernet 10Base-2 (10 megabits per second (Mbps)) configuration using coaxial cable, which is suitable for a small system. Other networking systems, such as Token Ring, could also be employed.

FIG. 9a is a diagram illustrating the connection of computer modules 610a–i and one or more server modules 620a,b by an Ethernet repeater or switch in a larger 100 Mbps Ethernet 100Base-FX system. In this configuration, FIG. 9b illustrates a typical module shelf 500, with computer modules 610a–c and one repeater or switch 900 installed. The actual configuration of the network will depend on the needs of the customer and size of the overall system. The configurations of the above networks are for illustration purposes only. In practice, an Ethernet network may be configured with repeaters, switches, bridges, routers, or any other Ethernet compatible component in order to solve particular requirements. It should also be noted that other systems, such as Token Ring, could also be employed, and that any one of several network operating systems, such as Microsoft's NT, Novel's NetWare, or others may be employed for the data network, depending on the needs of the customer.

Figure 10:
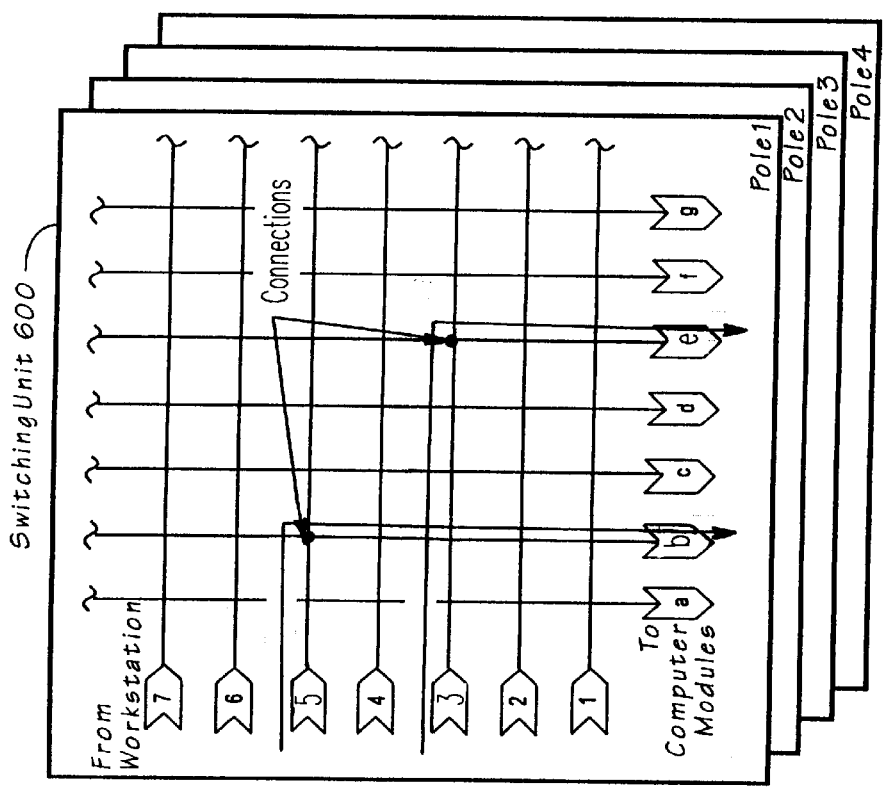
FIG. 10 is a functional diagram illustrating the operation of a computer switch of the system of FIG. 6.

FIG. 10 illustrates the operation of the switching unit 600. The switching unit 600 is composed of a number of commercially available ASIC (Application Specific Integrated Circuits), with a number of poles needed to match the number of conductors used in the workstation transmission cable 105. In the current embodiment, the switching unit is a four pole, latching switch where the desired connection will remain until an unlatching signal is received. The design of the switching unit 600 is modular so that it can be readily adapted to other workstation transmission cable 105 configurations. In other embodiments that employ fiber optics in the workstation transmission cable 105, the fiber optic decoder/encoder is installed on the workstation side of the switching unit 600, and standard copper cable is used from the output of the switching unit 600 to the computer module 610.

Figure 11:
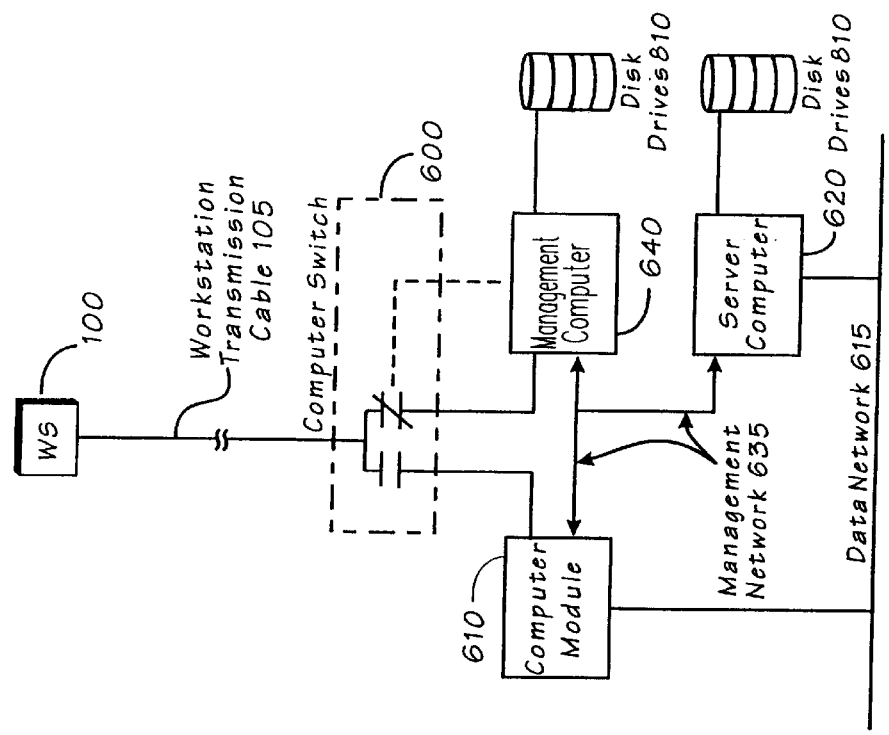
FIG. 11 is a schematic illustrating the functions of a management computer of the system of FIG. 6.

FIG. 11 is a schematic illustrating the relationship between the workstation 100, the computer switch 600, the computer module 610, the server computer 620 and the data network 615 and the management network 635. In the present embodiment, the management computer 640 and switching unit 600 continually monitor the workstation transmission cable 105 for activity. When activity is detected and no computer module 610 is connected, a connection is made to the management computer 640 which contains a number of workstation transmission cable communication circuits, similar to that shown in FIG. 7. The communications circuits consist of the transmission controller 300, the graphics adapter 310, the USB host controller 320 and the associated circuits 315 and 325. The management computer 640 then requests long-on information comprising user identification and a password from the workstation, and then compares information responsive to the request with information stored in the management computer's 640 local hard drive 810. If the user identification is verified and authenticated, the management computer 640 looks up the users network rights and minimum computer requirements, which are stored in local hard drive 810. The management computer 640 then identifies the next available computer module 610 that matches the users requirements and connects to that computer module 610 through the private management network 635. The management computer 640 then downloads to the selected computer module 610 the appropriate elements of the data Network Operating System (NOS) and all user specific and customization information which is also stored in the management computers 640 local hard drive 810. At the completion of this download, the management computer 640 instructs the switching unit 600 to connect the workstation 100 to the selected computer module 610 and disconnect the workstation 100 from the management computer 640. At this point, the workstation will be connected directly to the computer module, which in turn is connected to the network.

It should be noted that all log-on information is passed between the workstation 100 and the management computer 640, and not on the data network 615, where it would be available for unauthorized capture. In addition to the log-on and switching functions, some of the other primary functions of the management computer 640 include diagnostics, audit control, busy signal logging, timed disconnect, and power line monitoring and shutdown control functions.

The management computer 640 loads a comprehensive suite of diagnostic routines in each computer module 610 not currently connected to a workstation 100 using the dedicated management computer network 635. The results of the diagnostic routines are monitored and logged by the management computer 640 using an interrupt driven technique across the same management computer network 635. In the event a computer module 610 fails the diagnostic routines, the management computer 640 automatically locks out that computer module 610, thereby preventing its use by any workstation 100, and notifying the system administrator of the failure via e-mail or other means.

The management computer 640 also maintains a complete audit trail of each user's activity. This trail includes the time, date, location, and identity of the person logging on (successfully or unsuccessfully), which applications programs are used, which files are opened, and which servers are accessed. This audit trail is stored in a database format in the management computers 640 local hard drive 810, which allows various reports to be created, and excessive failed log-on attempts, or other similar alarms, to be given to the system administrator.

If all of the computer modules 610 are in use, the next person logging-on will get a busy signal. However, the management computer 640 maintains a reverse stack of the workstations 100 trying to log-on and connects the next available computer module 610 on a first-in, first-served basis. The management computer 640 maintains a busy signal frequency log that can be used by management to determine if additional computer modules 610 should be installed.

If for any reason a user stops using the computer, for some programmable period of time, the management computer 640 disconnects that workstation 100 from the computer module 610 and return it to the available pool. The disconnect process begins with a warning beep and message, during which time pressing any key will reset the timer. After a final time-out, the management computer 640 saves the current memory contents of the computer module 610 to its local hard drive 810 and logs that workstation 100 as being disconnected in the disconnect log. When the user returns, and presses any key, the management computer 640 begins a new log-on session. When the identification and authentication process has been successfully completed, the management computer 640 checks the disconnect log and if this user is found, the saved computing session will be restored from disk and the user can continue where the user left off.

The power supplies 625 provide information on the condition of commercial power, the status of the batteries in the UPS 630, and the condition of the power supplies 625 themselves. The management computer 640 acts on that information. In the event of a commercial power failure, an under voltage condition, or any other of a number of programmable conditions that disconnects commercial power, the management computer 640 begins an orderly shutdown of the entire system. First, all users are given a warning that a shutdown is eminent and that they should save their work and log-off. Users who do not respond to this message are subject to the same shutdown procedure as described in the timed disconnect function, described above. The shutdown procedure is organized so that the power is turned off for each shelf 500 when all of the computer modules 100 in that shelf 500 are shut down. When all of the shelves 500 in one vertical chassis are shut down, the power supply 625 in that vertical chassis is turned off. Then the next vertical chassis, and so forth, until the process is completes. This load-shedding function is designed to minimize the drain on the UPS 630 while preserving as much power as possible for the management computer 640 and server modules 620 to complete their tasks and remain on-line as long as possible.

The management computer 640 is a highly reliable, fault-tolerant, multiprocessor, modular computer that can be scaled up or down to accommodate the overall size of the computing system and the number of optional management functions the customer requires. The management computer 640 is operated by a suite of control programs using a multitasking, multithreaded, multiprocessor operating system, such as Microsoft's Windows NT with Advanced Server for example. Multitasking and multithreading capability is required to support multiple sessions of the same function, simultaneous log-on sessions for example.

Figure 12:
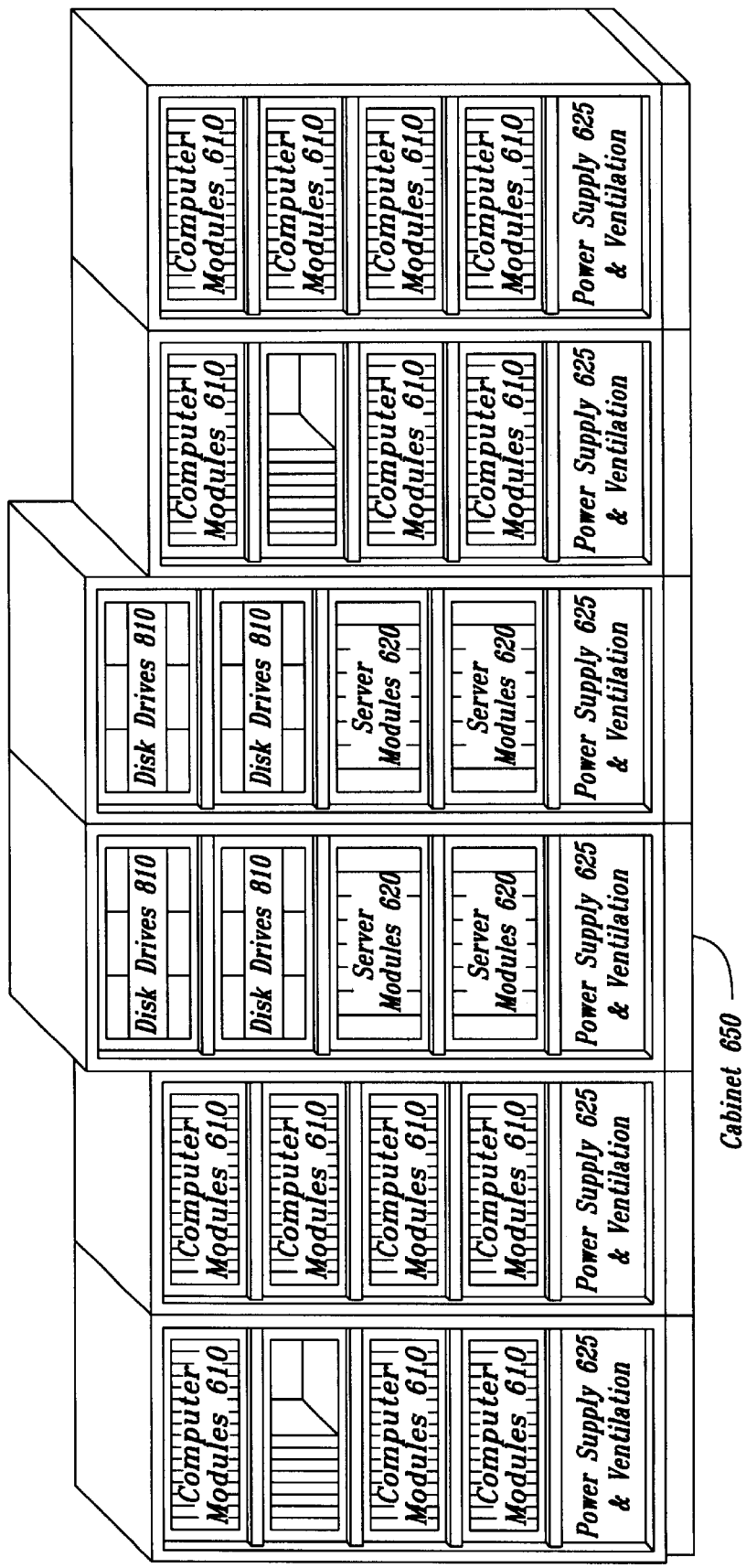
FIG. 12 illustrates a cabinet configuration of the computer module of FIG. 7.

FIG. 12 illustrates a typical cabinet 650. The cabinet 650 is composed of one or more freestanding metal chassis, approximately 60 to 72 inches high, 3 feet deep, and with a front opening suitable for a 19 inch or 24 inch, pre-punched rack mounting frame. Individual modules are inserted into a module shelf 500. These shelves are designed specifically for each type of module, computer module 610, server modules 620, management computer 640, disk drives 810, and so forth. The back end of the shelves is were the plug-in connector for each module are located. The depth of the card-edge connectors on the module varies so that all signal connections are made before the power supply connections. This allows each module to be hot swappable. The rear of each vertical chassis is covered with a lockable sheet metal door fitted with EMI/RFI gasketing. The front of the vertical chassis is also covered with a lockable sheet metal door frame with a smoked Lexan panel.

Thus, the embodiments shown and described provides a new computing system that has the flexibility and convenience of a distributed network of PCs, as well as the reliability, security, and robustness of the classic centralized mainframe computer.

The embodiments shown and described separate the user interface elements of a personal computer, called the workstation, from the remainder of the computer, called the computer module, for the purpose of centralizing the computer modules in a secure computer cabinet. The media used to connect the workstation with the computer module, called the workstation transmission system, consists of standard Ethernet Unshielded Twisted Pair (UTP), or fiber optic cable, depending on the transmission technology employed. The centralization of the computer modules converts a network of computers from the distributed processor model, to the centralized processor model that is used by mainframe and minicomputers, while maintaining the highly successful distributed processing model. Some of the many advantages of this equipment centralization include:

(a) the ability to design, install, and test the entire network system in the computer cabinet, at the factory, which eliminates the need for field installation of concentrators, hubs, or other similar devices;

(b) improved physical security by centralizing the most expensive portion of the computer in a secured computer cabinet, or equipment room, leaving only a part of the computer, the workstation, in employee work areas;

(c) improved data security by centralizing all permanent data storage devices (hard drives, tape drives, CD-ROMs, etc.) in the secured computer cabinet;

(d) improved system reliability by reducing the number of component parts in the system by eliminating redundant power supplies and other similar components and replacing them with fewer, higher quality components; and (e) improved maintainability by having most maintenance performed in the computer cabinet, and by having most maintenance limited to the exchange of hot-switchable modules.

The embodiments shown and described also provide a centralized switching system that will connect, on demand, any one of a plurality of workstations to any one of a lesser number of computer modules, for the purpose of more efficiently using available computing resources. The use of a central workstation switching system is predicated on the fact that in any large system of individual computers, not all computers are being used at any given time. There are several reasons for this including absenteeism, lunch or work breaks, trips and vacations, meetings and telephone calls, performing non-computer related work, and many others. In many organizations, the computer utilization factor is as low as 40 percent, or even lower. The ability to switch any one of a plurality of workstations to any one of a lesser number of computer modules is analogous to a telephone PBX which may switch any one of say a 1,0000 telephone extensions to any one of perhaps 100 outgoing trunk lines. There are several advantages to such a switching system, in addition to those cited above, including:

(a) using a highly reliable management computer to manage the computer switch and the connection of a workstation to a specific computer module, all log-on data traffic (user ID, passwords, and user rights information) is removed from the network, dramatically improving system security;

(b) optionally removing or locking out the floppy drive at the workstation during the log-on process prevents log-on data capture, or the capture of sensitive data stored on the network, also improves system security;

(c) continually testing and monitoring computer modules, servers, and cable runs using a centralized suite of diagnostic procedures, thereby significantly improving reliability.

(d) improving maintainability and reducing costs by having most maintenance performed in the computer room, and by having most maintenance limited to the exchange of hot-switchable modules; and (e) eliminating most, if not all, local hard drives leads to better control of software location and upgrading; and the centralization of user information, simplified systems administration and reducing cost.

Additionally, as far fewer computer modules are required than workstations a significant hardware and installation cost savings is realized. Moreover, because there are fewer computer modules and other components, maintenance costs and spare parts inventory are reduced. Further, because the number of CPU based software licenses required are based on the number of computer modules installed rather than on the number of workstation, and because the software usage metering system built into the management computer allows the least expensive software licensing agreements to be obtained, significant software cost savings are realized. In large systems with a mix of computer modules, Intel Pentium and Pentium II based computer modules for example, upgrading one particular user to a more powerful computer module is accomplished by changing a entry in the user information file maintained in the management computer, thereby reducing administrative costs. (Pentium and Pentium II are trademarks of Intel Corporation.) Improved management oversight and control is possible because of the extensive system usage and performance logs maintained by the management computer, further reducing administrative costs. Reduced power consumption results because of several reasons. These reasons include the significantly reduced number of computer modules and other components, the use of fewer and more efficient power supplies, and the use of programmable load shedding function in the management computer which shuts down shelves of unused computer, server, and other modules during periods of low usage such as evening, weekends, and holidays, further reducing the total cost of ownership.

Although illustrative embodiments of the present invention have been described with reference to the accompanying drawings, it is to be understood that the invention is not limited to these precise embodiments, and that various modifications of the disclosed embodiments, as well as other embodiments of the invention, will be apparent to persons skilled in the art upon reference to this description. It is therefore intended that the appended claims will cover any such modifications or embodiments as falling within the true scope of the invention.

What is claimed is:

1. A computer system comprising:
    a plurality of computer workstations, each computer workstation not having a processor, and each computer workstation comprising:
        a monitor;
        a first portion of a video display adaptor connected to the monitor;
        an input device; and
        a workstation transmission adaptor connected to the first portion of a video display adaptor and the input device;
    a plurality of computer modules, each computer module comprising:
        a processor;
        short term memory connected to the processor;
        long term storage connected to the processor;
        a second portion of a video display adaptor connected to the processor;
        a module transmission adaptor connected to the second portion of a video display adaptor and the processor; and
        a management network interface circuit connected to the processor;
    a switching unit connected to each of a plurality of the module network adaptors;
    a plurality of cables forming a network of connections connecting the workstation transmission adaptors of each of a plurality of the computer workstations and the switching unit;
    a management computer connected to the switching unit and the management network interface circuit of a plurality of the computer modules, the management computer operating to automatically connect and disconnect individual computer workstations to individual computer modules, through the switching unit; and
    more computer workstations than computer modules and wherein the management computer disconnects idle computer workstations from computer modules and connects previously idle computer workstations that become active to computer modules not then connected to another computer workstation.

2. The system of claim 1 wherein the management computer saves information regarding the state of computer module connected to a computer workstation when such computer workstation is disconnected from such computer module.

3. The system of claim 2 wherein the management computer transfers the saved information for a computer workstation, when the computer workstation is reconnected to a computer module, to such computer module.

* * * * *